(12) United States Patent
Lim

(10) Patent No.: US 7,190,680 B2
(45) Date of Patent: Mar. 13, 2007

(54) APPARATUS AND METHOD OF REALIZING LINK ACCESS CONTROL PROTOCOL FOR IP MULTICASTING PACKET TRANSMISSION IN A MOBILE COMMUNICATION NETWORK

(75) Inventor: Byung Keun Lim, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 1205 days.

(21) Appl. No.: 10/026,775

(22) Filed: Dec. 27, 2001

(65) Prior Publication Data

US 2002/0083203 A1   Jun. 27, 2002

(30) Foreign Application Priority Data

Dec. 27, 2000   (KR)   ................. 2000-83035

(51) Int. Cl.
*H04H 1/00*   (2006.01)
(52) U.S. Cl. ................. 370/312; 370/329; 370/466
(58) Field of Classification Search ................ 370/310, 370/312, 329, 341, 432, 464–467
See application file for complete search history.

(56) References Cited

U.S. PATENT DOCUMENTS

| 5,812,531 | A | * | 9/1998 | Cheung et al. ............. 370/255 |
|---|---|---|---|---|
| 6,141,347 | A | * | 10/2000 | Shaughnessy et al. ...... 370/390 |
| 6,512,756 | B1 | * | 1/2003 | Mustajarvi et al. ......... 370/341 |
| 6,865,163 | B1 | * | 3/2005 | Bergenwall et al. ........ 370/288 |
| 6,912,402 | B1 | * | 6/2005 | Haumont et al. ........... 455/519 |
| 7,058,076 | B1 | * | 6/2006 | Jiang ......................... 370/465 |

FOREIGN PATENT DOCUMENTS

KR   00240645 B1   10/1999

* cited by examiner

*Primary Examiner*—Chau Nguyen
*Assistant Examiner*—Kerri M. Rose
(74) *Attorney, Agent, or Firm*—Ked & Associates, LLP

(57) ABSTRACT

Disclosed is a method of realizing a link access control protocol for IP M/B packet transmission in a mobile communication network. The method of the invention comprises the steps of: receiving by an LAC of a BTS/BSC an Internet IP M/B packet transferred via a BSC/PCF from an Internet host and a multicasting server, storing the Internet IP M/B packet into an internal buffer, and segmenting the Internet IP M/B packet into a radio packet frame size; adding sequence numbers to the segmented radio packet frames and transmitting a CIBP SDU into a mobile terminal; and assembling, in the mobile terminal, the CIBP SDU for the received radio packet frames and forming the IP M/B packet, and transferring the formed IP M/B packet into an upper layer.

29 Claims, 4 Drawing Sheets

APPARATUS AND METHOD OF REALIZING LINK ACCESS CONTROL PROTOCOL FOR IP MULTICASTING PACKET TRANSMISSION IN A MOBILE COMMUNICATION NETWORK

BACKGROUND OF THE INVENTION

1. Field of the Invention

The present invention relates to an apparatus and method of realizing a link access control protocol between a mobile terminal and a base station for IP M/B packet transmission in a mobile communication network, by which an IP M/B packet data, which is received via the Internet, can be transmitted into a number of mobile terminals via one node.

2. Description of the Related Art

The IMT-2000 basically provides both of line and packet modes, i.e. the line mode for a real time service such as audio and the packet mode a service which does not require real time such as data. However, the inefficiency of the IMT-2000 network having both of packet and line networks and the inefficiency of using radio resources in line switching incur a movement integrating the next generation mobile communication network into a packet-based IP network or ALL-IP network by major next generation mobile communication standardization organizations such as the 3GPPs.

The All-IP network uses the IP in all transmission from a terminal up to the core. It is expected that the ALL-IP network will be driven into a form evolved from the conventional mobile communication networks for compatibility with the current networks. The 3GPP defines the ALL-IP core network as "a core network of the Release 2000 using the IP in transmitting all of user data and signals." The 3GPP2 defines the ALL-IP core network as "an IP-based network using the IP in transmitting user data and signals between all network entities including a terminal."

The All-IP network has an open structure in the form of a data network so that various services, in particular, IP-based services which will develop in the future can be effectively introduced and integral maintenance using the IP can be carried out in low price. Further, using the IP provides simple services regardless of access means such as PSTN, LAN, HIPERLAN, Cable Network and Radio Network while effectively establishing M/B services.

FIG. 1 is a schematic diagram illustrating a mobile communication network structure for an access service of an Internet packet data.

Referring to FIG. 1, the mobile communication network is comprised of a server 102 located in the Internet 100 for a packet data server; a router 104 for routing; a carrier's intranet 106 including a Home Agent (HA) acting as a gate way for access of a mobile IP user and an Authentication, Authorization and Accounting (AAA) server for performing functions of authentication, authorization and accounting about the user; a Mobile Switching Center (MSC)/Visitor Location Register (VLR) 120; Packet Data Serving Nodes (PDSN) 112 acting as an interface between two networks such as a Radio Access Network (RAN) 110 and a DCN; a base station system 114 for allocating and managing radio resources and performing a packet access service; and a mobile terminal 116 for radio packet communication connected to a mobile computing device and the like.

The base station system 114 includes a Base Transmission Station (BTS) for radio call access of the mobile terminal, a Base Station Controller (BSC) for controlling the BTS and a Packet Control Function (PCF) for connecting to a Packet Data Serving Node (PDSN) to provide a packet service.

Hereinafter description will be made in reference to the accompanying drawings.

Referring to FIG. 1, the mobile computing device such as a notebook computer and the mobile terminal 116, to which a radio data communication is supported, are required for the Internet access service of the packet data in such a mobile communication network. A cable for connecting between the mobile computing device and the mobile terminal is also necessary. The cable is connected to a serial port of the mobile computing device. Then, only setting a connecting program and a computer network enables the radio data communication of the mobile computer.

The mobile terminal 116 is radio linked with the BTS for radio call access and the BSC/PCF of the base station system 114, and Point-to-Point Protocol (PPP) linked with the packet data serving node 112.

The MSC/VLR 120 communicates with the base station system 114 to execute functions including movability control, call control, radio resource allocated-state control and wire network connection control about the mobile terminal 116 by using the BTS/BSC/packet controller. Further, the MSC/VLR 120 communicates with a PSTN/PCS/PLMN 124 and a Home Location Register (HLR)/Authentication Center (AUC) 122.

In such a mobile communication network, an IP Multicasting/Broadcasting (M/B) packet data is transmitted in a one-to-multi-mode into the mobile terminal from all IP M/B server 108 located in the carrier's intranet 106.

Each of the PDSN1 and PDSN2 112 receives an M/B IP datagram or message from the server or host 102 located in the internet 100 and the IP M/B server 108.

Then, the PDSN1 and PDSN2 112 execute multicasting, i.e., transmission of the same packet into a specific subnet in a network address or broadcasting, i.e., transmission of a data packet into all nodes in the network.

For the purpose of this, the mobile terminal 116 visits the PDSN1 and PDSN2 112 to establish a PPP link.

The PDSN1 and PDSN2 112 respectively transmit the broadcasting message into the established mobile terminal 116 via the PPP link established by the mobile terminal 116.

A channel is allocated to transmit each PPP datagram from the each PDSN 112 up to the mobile terminal 116.

Every mobile terminal 116 respectively visits the each PDSN 112 to establish the PPP link for the M/B packet data service, and the M/B message is transmitted via the established PPP link. Therefore, the channel for transmitting the PPP datagram is respectively allocated to the every mobile terminal 116, thereby wasting channel resources by a large amount.

SUMMARY OF THE INVENTION

Accordingly, the present invention has been devised to solve the foregoing problems.

It is therefore an object of the invention to provide an apparatus and method of realizing a link access control protocol between a mobile terminal and a BSC for IP M/B packet transmission in a mobile communication network, in which a Media Access Control (MAC) protocol for effectively transferring an IP M/B packet between a BTS and the mobile terminal is realized as a Cellular M/B MAC Protocol (CTBP) so that a data received in a physical data is transferred into an upper data layer.

It is another object of the invention to provide an apparatus and method of realizing a link access control protocol between a mobile terminal and a BSC for IP M/B packet transmission in a mobile communication network, in which a Link Access Controller (LAC) is provided over an MAC to segment and assemble an IP M/B packet data so that the sizes of various MAC frames can be freely managed according to channel conditions of a radio range between the BTS/BSC and the mobile terminal.

It is further another object of the invention to provide an apparatus and method of realizing a link access control protocol between a mobile terminal and a BSC for IP M/B packet transmission in a mobile communication network, in which a re-transmission protocol is realized based upon a re-transmission request message NAK between a BTS and the mobile terminal so that a M/B packet data can be perfectly transmitted in a radio link.

In accordance with a preferred embodiment of the invention to obtain the foregoing objects, an apparatus of realizing a link access control protocol for IP multicasting/broadcasting (M/B) transmission in a mobile communication network comprises: a packet data serving node (PDSN) for receiving an IP M/B packet from an IP M/B packet server or an Internet host and transmitting the IP M/B packet after converting into a transmission format; a base station system including a base station controller/packet controller function (BSC/PCF) and a base transmission station (BTS), the BSC/PCF receiving the IP M/B packet from the PDSN, converting the IP M/B packet into a cellular M/B request message and transmitting the cellular M/B request message into the BTS under the control, and the BTS receiving the IP M/B packet from the BSC, segmenting the IP M/B packet into a radio frame size and transmitting radio frames of IP M/B packet; a mobile terminal for receiving and assembling the segmented radio frames of IP M/B packet, transmitted from the BTS by radio, to form the IP M/B packet; and a M/B link access control means based upon a re-transmission request message for frame transmission confirmation on the radio link between the mobile terminal and the BTS/BSC.

The BTS/BSC includes a LAC sub-layer including a link access controller (LAC) for storing the IP M/B packet, received from the BSC/PCF, into an internal buffer, and segmenting the IP M/B packet into a radio packet frame size necessary to a cellular IP multicast MAC protocol (CIBP); and a medium access control (MAC) sub-layer for transmitting a CIBP service data unit (SDU), received from the CIBP at a lower layer of the LAC, into the mobile terminal via a physical layer.

The LAC allocates sequence numbers to the radio packet frames of the segmented IP M/B packet, and transfers the CIBP SDU into the CIBP.

The LAC transmits the sequence number of a CIBP SDU corresponding to the re-transmission request message upon receiving the re-transmission request message, when receiving the re-transmission request message by using a signaling link access controller for receiving the re-transmission request message of a specific radio packet frame from the mobile terminal.

The LAC transmits a specific CIBP SDU, deletes the CIBP SDU if a re-transmission request message is not received when a radio packet frame time has lapsed after transmitting the CIBP SDU to process a new IP M/B packet.

The mobile terminal includes an MAC sub-layer with a physical layer for receiving the radio packet frames transmitted from the BTS, and a cellular IP multicast MAC protocol (CIBP) for transferring the received radio packet frames as a CIBP SDU into an upper layer; and an LAC sub-layer for assembling data in the CIBP SDU transferred from the MAC sub-layer to form the IP M/B packet and transferring the IP M/B packet into an upper data layer.

The LAC inspects if the transferred CIBP SDU is received in the unit of the IP M/B packet, and transmits the re-transmission request message for the sequence number of the CIBP SDU, which is not received, via a signaling LAC into an LAC of the BTS.

In accordance with a preferred embodiment of the invention to obtain the foregoing objects, a method of realizing a link access control protocol for IP M/B packet transmission in a mobile communication network, the method comprising the steps of receiving by an LAC of a BTS/BSC an Internet IP M/B packet transferred via a BSC/PCF from an Internet host and a multicasting server, storing the Internet IP M/B packet into an internal buffer, and segmenting the Internet IP M/B packet into a radio packet frame size; adding sequence numbers to the segmented radio packet frames and transmitting a CIBP SDU into a mobile terminal; and assembling, in the mobile terminal, the CIBP SDU for the received radio packet frames and forming the IP M/B packet, and transferring the formed IP M/B packet into an upper layer.

DETAILED DESCRIPTION OF THE PREFERRED EMBODIMENT

Figure 1:
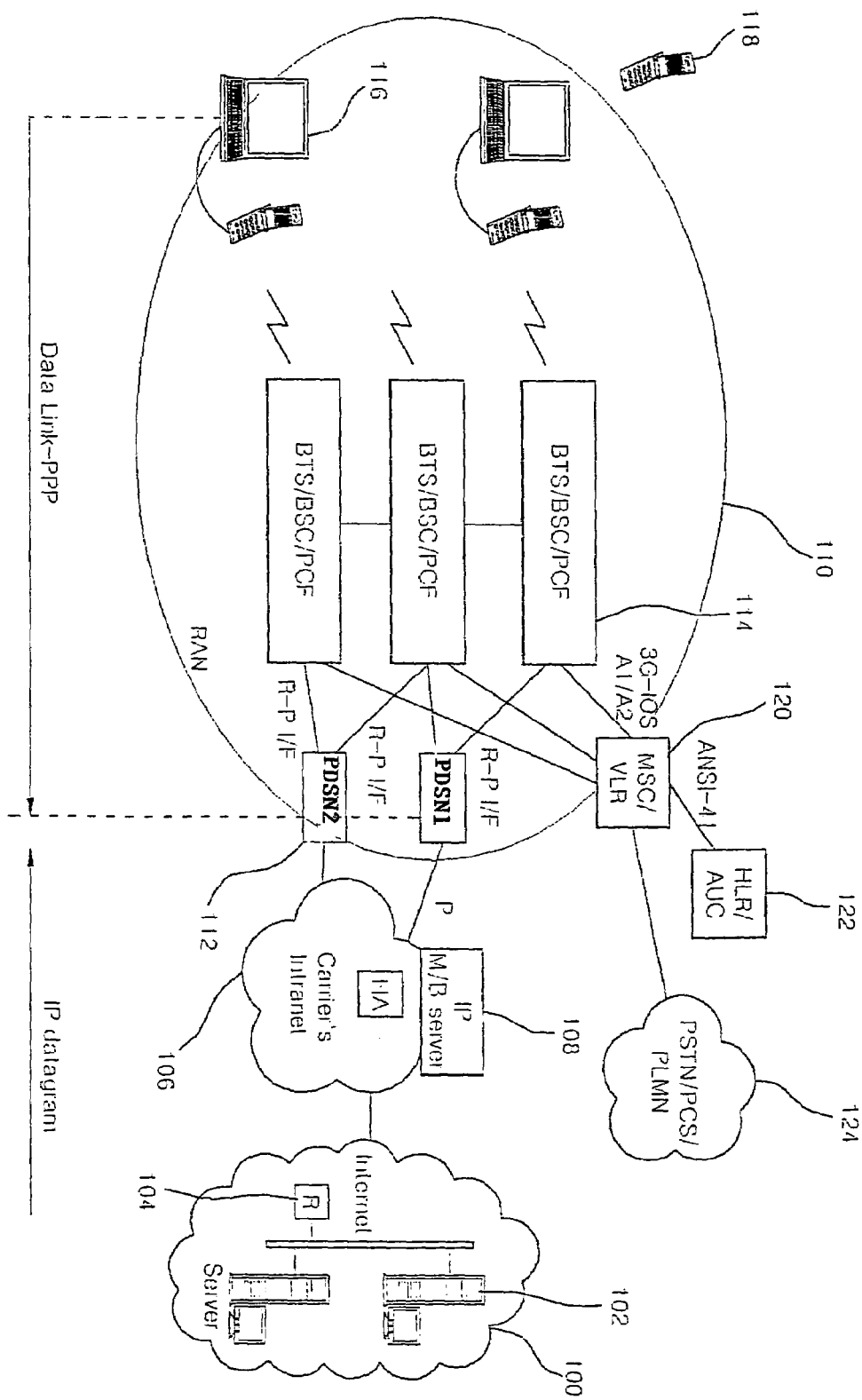
FIG. 1 is a schematic diagram illustrating a mobile communication network for an access service of an Internet packet data.
Figure 2:
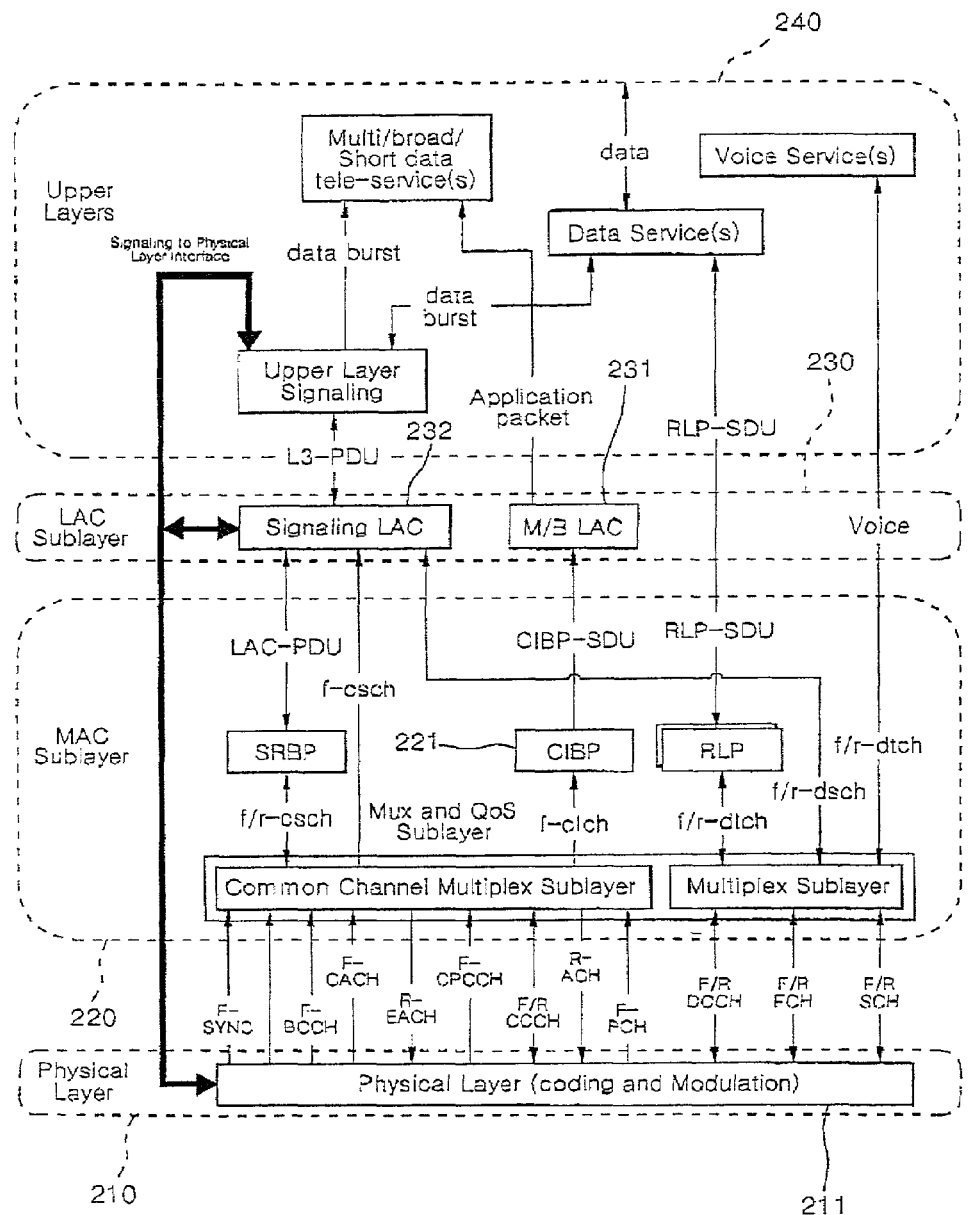
FIG. 2 is a layer structure illustrating a protocol in a mobile terminal in an apparatus of realizing a link access control protocol for IP M/B packet transmission in a mobile communication network in accordance with an embodiment of the invention.

FIG. 1 shows the structure of an apparatus of realizing a link access control protocol for IP M/B packet transmission in a mobile communication network in accordance with an embodiment of the invention, and FIG. 2 shows a protocol layer structure in a mobile terminal in the apparatus of realizing a link access control protocol for IP M/B packet transmission in the mobile communication network in accordance with the embodiment of the invention.

Referring to FIG. 1, the mobile communication network is comprised of a PDSN 112 for receiving au IP M/B packet from an IP M/B server 108 or host of the Internet 100 and multicasting/broadcasting the IP M/B packet converted into a transmission format; a station system 114 constituted of a BSC/PCF for receiving the IP M/B packet from the PDSN 112, converting the received IP M/B packet into an IP multimedia request message and transmitting the message into a controlled area, and a BSC for receiving the cellular/request message from the BSC/PCF and transmitting the message into an M/B channel based upon header information; a mobile terminal 116 for transferring the cellular M/B packet, which is received via the M/B channel of the base station system, into a higher IP M/B layer.

FIG. 2 is a layer structure illustrating an LAC protocol layer in a mobile terminal, in which the layer structure corresponds to that of the BTS.

Referring to FIG. 2, the layers comprise a physical layer 210, a Media Access Control (MAC) sublayer 220, a Link Access Control (LAC) sublayer 230 and upper layers.

In reference to the accompanying drawings, the following description will present the apparatus and method of realizing the M/B LAC protocol for radio IP M/B packet transmission among the mobile terminal, the BTS and the BSC in the mobile communication network having the foregoing structure.

Referring to FIG. 1, when an IP M/B service is provided from the IP M/B server 108 or the host of the Internet for multicasting/broadcasting of an Internet IP data, the PDSN 112 receives the IP M/B packet transmitted from the IP M/B server 108 or the Internet host.

The PDSN 112 transmits the receiving M/B packet into the PCF of the base station system 114, in which the M/B packet has a body data as a PPP frame data and the IP M/B identifier indicated as a protocol identifier.

The BSC/PCF of the base station system 114 transfers the received IP M/B message into the corresponding BTS after converting into an IP M/B request message.

When the BTS of the base station system transfers an M/B packet message into the mobile terminal 116 via a radio M/B channel based upon header information of the IP M/B request, the mobile terminal 116 transfers the M/B packet message received via the M/B channel into the upper M/B layers.

The protocol layer structure as shown in FIG. 2 is provided in order to effectively transfer the cellular M/B packet between the BTS of the base station system and the mobile terminal 116. FIG. 2 shows the LAC layer structure in the mobile communication structure 116, in which protocol layer structure of the BTS/BSC is symmetric to that of the terminal.

An M/B Link Access Controller (LAC) is provided in the M/B LAC sublayer of the BTS/BSC. The M/B LAC stores the IP M/B packet data, received from the BSC/PCF, into an internal temporary buffer; adds sequence numbers to the IP M/B packet data, segmented into a radio frame size necessary to a lower CIBP; and transfers a CIBP Service Data Unit (SDU) into a CIBP of an MAC sublayer as a lower layer. A CIBP SDU of a MAC layer executes transmission into the mobile terminal via an M/B channel of the physical layer.

The M/B LAC of the BTS/PCF executes re-transmission about a sequence frame of the corresponding CIBP SDU when the re-transmission request message NAK of the mobile terminal is received from a signaling LAC. There is no more re-transmission request message NAK when a predetermined radio frame time has elapsed after the transmission, the M/B LAC of the BTS cancels the CIBP SDU received from the network and stored in the buffer and processes a new received M/B IP data.

Referring to the operation of the mobile terminal, with the data received into the M/B channel in the physical layer, an M/B LAC 231 in the LAC sublayer 230 assembles the data of the CIBP SDU, received from the CIBP 221 of the lower MAC sublayer 220, to form the IP M/B packet. The formed IP M/B packet is transferred into upper layers 240 as an application packet.

The M/B LAC 231 of the mobile terminal inspects receiving in the unit of the IP M/B packet. If any CIBP SDU is not received, the re-transmission request message NAK is transmitted by transmitting the sequence number of the CIPB SDU, which is not received, into the M/B LAC 231 of the BTS/BSC.

The BTS transmits the IP M/B packet, segmented into the radio packet frame size, and the mobile terminal 116 assembles the radio packet frames, and the BTS and the mobile terminal 116 ensure transmission in the radio range with the radio LAC protocol using the sequence numbers added to the radio packet frames.

Figure 3:
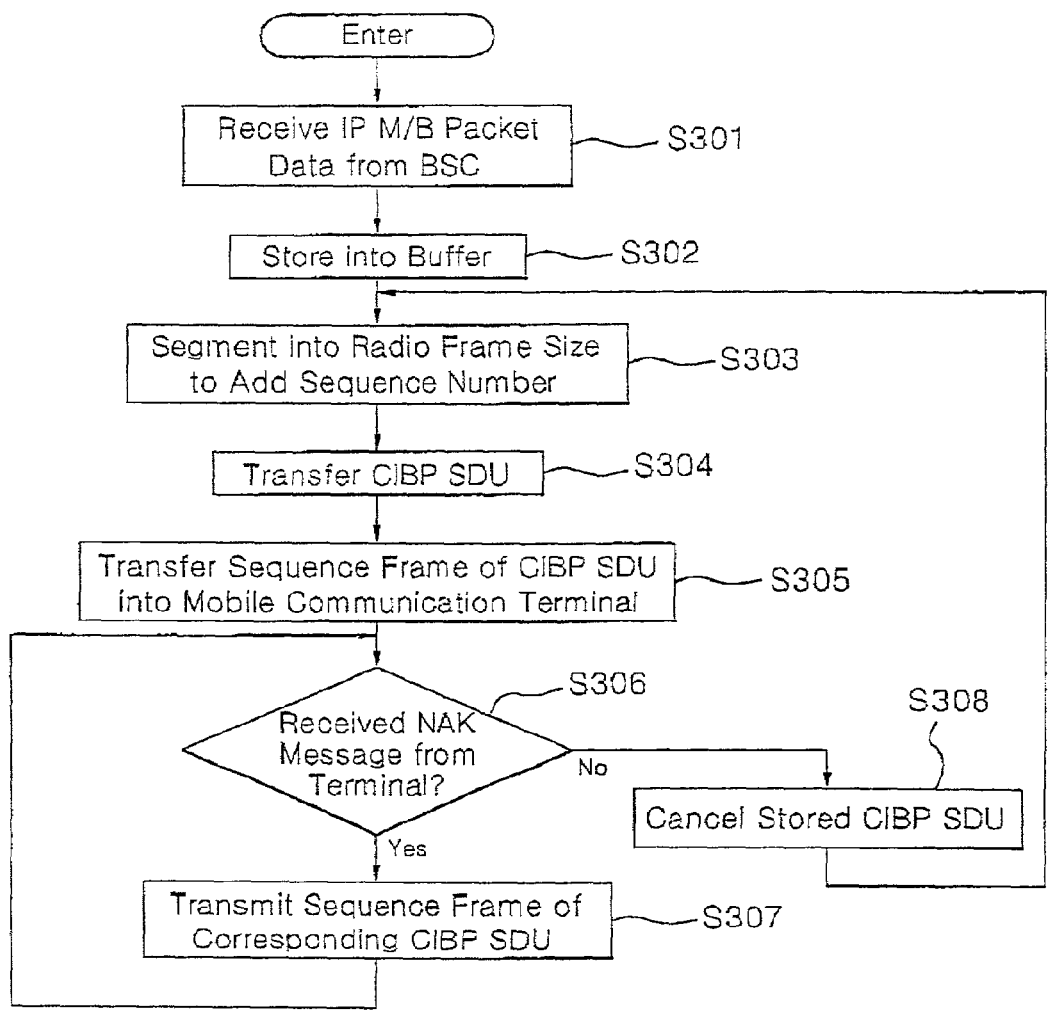
FIG. 3 is a flow chart illustrating a method of realizing a link access control protocol in a terminal/terminal controller for IP M/B packet transmission in a mobile communication network in accordance with an embodiment of the invention.

FIG. 3 is a flow chart illustrating operation procedures in the BTS.

Referring to FIG. 3, the M/B LAC provided in the LAC sublayer of the BTS in the base station system receives the IP M/B packet data transmitted from the BSC/PCF in step 301. The IP packet data is stored in the internal temporary buffer in S302. The IP M/B packet is segmented into the radio frame size necessary to the CIBP and added with the sequence numbers for transfer as the CIBP of the MAC sublayer functioning as the lower layer in S303. The CIBP SDU is transferred into the CIBP in S304.

The CIBP SDU segmented into the radio frame size is transmitted into the mobile terminal via the M/B channel of the physical layer through a common channel multiplex sublayer in S305.

When the CIBP SDU is transmitted, the LAC sublayer of the BTS confirms from the signaling LAC if the re-transmission request message NAK is received from the mobile terminal in S306.

If it is confirmed that the re-transmission request message NAK is received, the corresponding CIBP SDU is re-transmitted into the corresponding mobile terminal in S307. If the re-transmission request message NAK is not received when a specific radio frame time has elapsed, the M/B LAC of the BTS cancels the CIBP SDU stored in the buffer of the IP M/B packet received from the network in step S308, and processes a new received IP M/B packet in S303.

Figure 4:
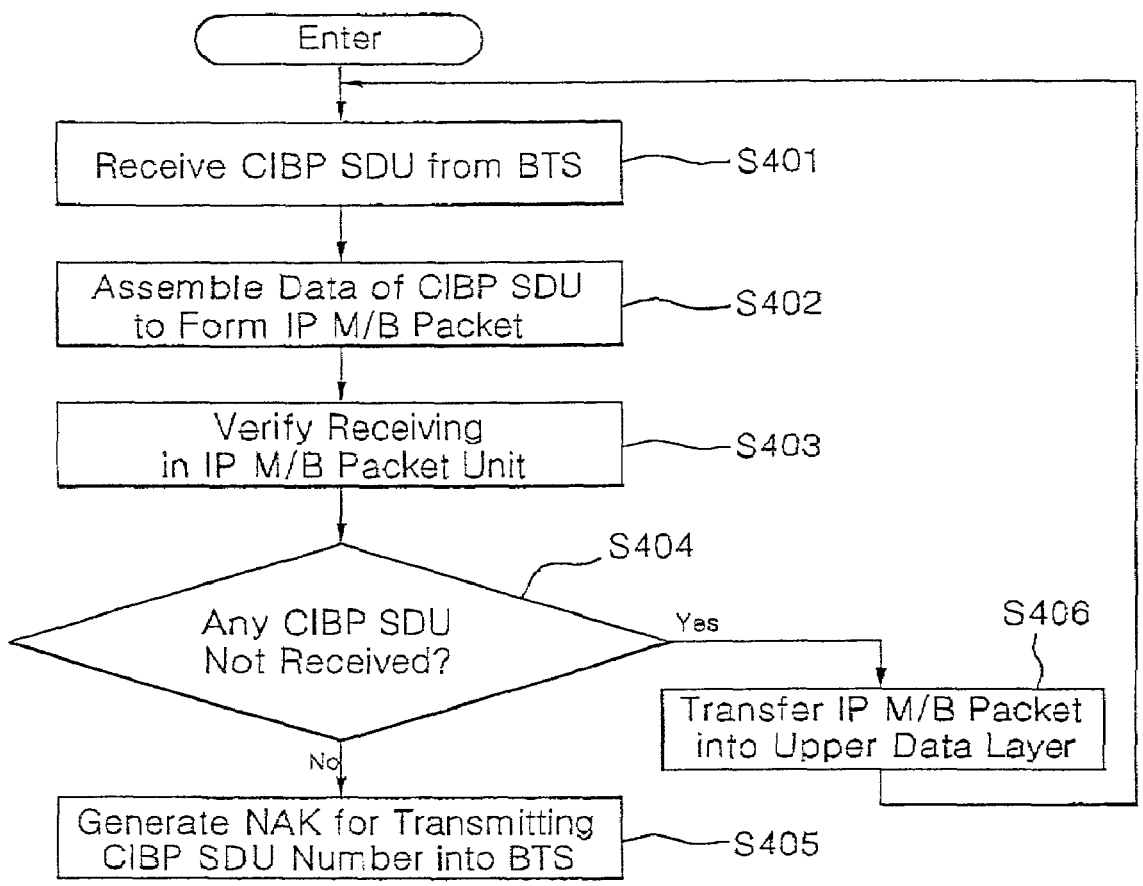
FIG. 4 is a flow chart illustrating a method of realizing a link access control protocol in a mobile terminal for IP M/B packet transmission in a mobile communication network in accordance with an embodiment of the invention.

Operation procedures in the mobile terminal after receiving the radio IP M/B packet are described in reference to FIGS. 2 and 4.

The IP M/B packet transmitted from the BTS/BSC is received into the M/B channel of the physical layer 210 and into the CIBP 221 of the MAC sublayer 220 in S401. The CIBP 221 transfers the received CIBP SDU into the M/B LAC 231 of the upper LAC sublayer 230.

The M/B LAC 231 in the upper LAC sublayer 230 corresponds to the M/B LAC of the BTS and assembles the data of the CIBP SDU received from the CIBP 221 of the lower MAC sublayer 220 to form the IP M/B packet in S402.

The M/B LAC 231 of the mobile terminal inspects receiving in the unit of the IP M/B packet in S403. If any CIBP SDU is not received, the re-transmission request message NAK about the CIBP SDU, which is not received, is transmitted into the M/B LAC of the BTS via the signaling LAC 232 in S405.

A signal of the re-transmission request message NAK of the M/B LAC 231, which processes transmission/receiving of the IP M/B packet, is transferred via the signaling LAC 232 into the LAC sublayer 230 of the protocol layer inside the BTS and the mobile terminal. This provides a function of transferring the re-transmission request signal for ensuring radio transmission.

When the IP M/B packet is formed, the M/B LAC 231 transfers the M/B application packet into the upper data layer 240 in S406.

In accordance with the invention as described hereinbefore, the CIBP is realized in the MAC protocol and the LAC layer over the MAC layer so that the IP M/B data received from the Internet can be effectively transferred into the mobile terminal. The mobile terminal need not respectively visit the serving PDSN thereby avoiding the waste of the resources. One BTS can transmit the same Internet data into a number of mobile terminals.

The LAC layer protocol for transmitting/receiving, the cellular M/B packet between the BTS and the mobile terminal is realized in an upper layer over the MAC layer so that the sizes of the MAC frames can be managed freely according to the channel conditions of the radio range.

Further, the re-transmission protocol based upon the re-transmission request is realized in M/B data transmission between the BTS and the mobile terminal, thereby enhancing the reliability of the IP M/B data in the radio link.

What is claimed is:

1. An apparatus of realizing a link access control protocol for IP multicasting/broadcasting (M/B) transmission in a mobile communication network, the apparatus comprising:
   a packet data serving node (PDSN) for receiving an IP M/B packet from an IP M/B packet server or an Internet host and transmitting the IP M/B packet after converting the IP M/B packet into a transmission format;
   a base station system including a base station controller/packet controller function (BSC/PCF) and a base transmission station (BTS), the BSC/PCF receiving the IP M/B packet from the PDSN, converting the IP M/B packet into a cellular M/B request message and transmitting the cellular M/B request message into the BTS, and the BTS receiving the IP M/B packet from the BSC, segmenting the IP M/B packet into a radio frame size and transmitting radio frames of the IP M/B packet;
   a mobile terminal for receiving and assembling the segmented radio frames of the IP M/B packet, transmitted from the BTS by radio, to form the IP M/B packet; and
   a M/B link access control means based upon a re-transmission request message for frame transmission confirmation on the radio link between the mobile terminal and the BTS/BSC.

2. The apparatus of realizing a link access control protocol in accordance with claim 1, wherein the BTS/BSC comprises:
   a LAC sub-layer including a link access controller (LAC) for storing the IP M/B packet, received from the BSC/PCF, into an internal buffer, and segmenting the IP M/B packet into the radio packet frame size for a cellular IP multicast/broadcast MAC protocol (CIBP); and
   a medium access control (MAC) sub-layer for transmitting a CIBP service data unit (SDU), received from the CIBP at a lower layer of the LAC, into the mobile terminal via a physical layer.

3. The apparatus of realizing a link access control protocol in accordance with claim 2, wherein the LAC allocates sequence numbers to the radio packet frames of the segmented IP M/B packet, and transfers the CIBP SDU into the CIBP.

4. The apparatus of realizing a link access control protocol in accordance with claim 2, wherein the LAC transmits the sequence number of a GIBP SDU corresponding to the re-transmission request message upon receiving the re-transmission request message, when receiving the re-transmission request message by using a signaling link access controller for receiving the re-transmission request message of a specific radio packet frame from the mobile terminal.

5. The apparatus of realizing a link access control protocol in accordance with claim 2, wherein the LAC transmits a specific CIBP SDU, and deletes the CIBP SDU if a re-transmission request message is not received when a radio packet frame time has lapsed after transmitting the CIBP SDU to process a new IP M/B packet.

6. The apparatus of realizing a link access control protocol in accordance with claim 1, wherein the mobile terminal comprises:
   a MAC sub-layer having a physical layer for receiving the radio packet frames transmitted from the BTS, and a cellular IP multicast MAC protocol (CIBP) for transferring the received radio packet frames as a CIBP SDU into an upper layer; and
   a LAC sub-layer for assembling data in the CIBP SDU transferred from the MAC sub-layer to form the IP M/B packet and transferring the IP M/B packet into an upper data layer.

7. The apparatus of realizing a link access control protocol in accordance with claim 6, wherein the LAC sub-layer determines if the transferred CIBP SDU is received in the unit of the IP M/B packet.

8. The apparatus of realizing a link access control protocol in accordance with claim 7, wherein the LAC sub-layer transmits the re-transmission request message for a sequence number of the CIBP SDU, which is not received, via a signaling LAC into a LAC of the BTS.

9. The apparatus of realizing a link access control protocol in accordance with claim 1, wherein each of the mobile terminal and the BTS/BSC comprises a signaling LAC for transmitting the re-transmission request message in processing transmission/receiving of the IP M/B packet.

10. The apparatus of realizing a link access control protocol in accordance with claim 1, wherein the BTS transmits the radio frames of the IP M/B packet across a common channel.

11. The apparatus of realizing a link access control protocol in accordance with claim 1, wherein the radio frames of the IP M/B packet are transferred via a multicast/broadcast (M/B) channel.

12. The apparatus of realizing a link access control protocol in accordance with claim 1, wherein the BTS segments the IP M/B packet into a plurality of CIBP service data units (SDU) and transmits the plurality of CIBP SDUs to the mobile terminal.

13. A method of realizing a link access control protocol for IP multicast/broadcast (M/B) packet transmission in a mobile communication network, the method comprising the steps of:
   receiving by a link access controller (LAC) of a BTS/BSC an Internet IP multicast/broadcast (M/B) packet transferred via a BSC/PCF from an Internet host or a multicasting server, storing the Internet IP M/B packet into an internal buffer, and segmenting the Internet IP M/B packet into a radio packet frame size;
   adding sequence numbers to the segmented radio packet frames and transmitting a cellular IP multicast/broadcast MAC protocol (CIBP) service data unit (SDU) to a mobile terminal; and
   assembling, in the mobile terminal, the CIBP SDU for the received radio packet frames and forming the IP M/B packet, and transferring the formed IP M/B packet into an upper layer of the mobile terminal.

14. The method of realizing a link access control protocol in accordance with claim 13, wherein a LAC of the mobile terminal determines if the transferred CIBP SDU is received and transmits a re-transmission request message about a SDU having a sequence number corresponding to the CIBP SDU, which is not received, into the BTS.

15. The method of realizing a link access control protocol in accordance with claim 14, wherein the BTS/BSC confirms whether the re-transmission request message is received from the mobile terminal via a signaling LAC, and re-transmits the SDU having the sequence number into the mobile terminal if the re-transmission request message is received.

16. The method of realizing a link access control protocol in accordance with claim 15, further comprising deleting the CIBP SDU of the stored IP M/B packet and processing a new received IP M/B packet if the re-transmission request message is not received in a designated time after a specific packet is transmitted from the mobile terminal into the signaling LAC.

17. The method of realizing a link access control protocol in accordance with claim 13, wherein the size of the radio packet frame segmented in the BTS is variably changed according to channel conditions.

18. The method of realizing a link access control protocol in accordance with claim 13, further comprising deleting the CIBP SDU from the internal buffer when a re-transmission request number is not received by the BTS/BSC within a specific time period.

19. The method of realizing a link access control protocol in accordance with claim 13, wherein the CIBP SDU of the IP M/B packet is transmitted across a common channel.

20. The method of realizing a link access control protocol in accordance with claim 13, wherein the IP M/B packet is transferred via a multicast/broadcast (M/B) channel.

21. A method of IP multicasting/broadcasting (M/B) transmission in a mobile communication network, the method comprising:
    receiving a IP M/B packet at a base station system from a packet data serving node (PDSN);
    converting the IP M/B packet into a cellular M/B message;
    segmenting the IP M/B packet into a radio frame size; and
    transmitting radio frames of the IP M/B packet via a common channel to a mobile terminal.

22. The method of claim 21, further comprising:
    transmitting a re-transmission request message when the mobile terminal fails to receive one of the segmented frames of the IP M/B packet.

23. The method of claim 22, wherein the base station system includes:
    a LAC sub-layer having a link access controller (LAC) to store the IP M/B packet, in a buffer and segment the IP M/B packet into the radio packet frame size for a cellular IP multicast/broadcast MAC protocol (CIBP); and
    a medium access control (MAC) sub-layer to transmit CIBP service data unit (SDUs) received from the CIBP at a lower layer of the LAC, to the mobile terminal via a physical layer.

24. The method of claim 23, wherein the LAC allocates a plurality of sequence numbers to the radio packet frames of the segmented IP M/B packet, and transfers the CIBP SDUs to the CIBP.

25. The method of claim 23, wherein the LAC transmits the sequence number of one of the CIBP SDUs corresponding to the re-transmission request message upon receiving the re-transmission request message, when receiving the re-transmission request message by using a signaling link access controller for receiving the re-transmission request message of a specific radio packet frame from the mobile terminal.

26. The method of claim 23, wherein the LAC deletes the CLBP SDU if the re-transmission request message is not received after a time period has lapsed after transmitting one of the GIBP SDUs.

27. The method of claim 21, wherein the mobile terminal comprises:
    a MAC sub-layer having a physical layer to receive the radio packet frames, and a cellular IP multicast MAC protocol (CIBP) to transfer the received radio packet frames as CIBP SDUs to an upper layer; and
    a LAC sub-layer to assemble data in the CIBP SDUs transferred from the MAC sub-layer to form the IP M/B packet and to transfer the formed IP M/B packet to an upper data layer.

28. The method of claim 27, wherein the LAC sub-layer determines if the transferred CIBP SDUs are received.

29. The method of claim 27, wherein the LAC sub-layer transmits the re-transmission request message for a sequence number of one of the CIBP SDUs that is not received.

* * * * *